US012672001B2

(12) United States Patent
Mackenbach et al.

(10) Patent No.: US 12,672,001 B2
(45) Date of Patent: Jun. 30, 2026

(54) SYSTEM AND METHOD FOR MANAGEMENT OF SECURED DEVICES

(71) Applicant: Dell Products L.P., Round Rock, TX (US)

(72) Inventors: Jeroen Mackenbach, Roosendaal (NL); Bradley K. Goodman, Nashua, NH (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 443 days.

(21) Appl. No.: 18/326,367

(22) Filed: May 31, 2023

(65) Prior Publication Data

US 2024/0406736 A1     Dec. 5, 2024

(51) Int. Cl.
H04M 1/66        (2006.01)
H04W 12/40       (2021.01)
H04W 12/71       (2021.01)

(52) U.S. Cl.
CPC ........... H04W 12/71 (2021.01); H04W 12/40 (2021.01)

(58) Field of Classification Search
CPC ...... H04W 12/71; H04W 12/03; H04W 12/08
See application file for complete search history.

(56) References Cited

U.S. PATENT DOCUMENTS

| | | | |
|---|---|---|---|
| 2021/0012073 A1* | 1/2021 | Suko .................. | G06K 19/0723 |
| 2025/0220419 A1* | 7/2025 | Elshafie ............... | H04W 12/03 |

OTHER PUBLICATIONS

Macias, Erick, et al., "NFC Active and Passive Peer-to-Peer Communication Using the TRF7970A," Texas Instruments, SLOA192B, Apr. 2014 (33 Pages).

* cited by examiner

*Primary Examiner* — Shantell L Heiber
(74) *Attorney, Agent, or Firm* — WOMBLE BOND DICKINSON (US) LLP

(57) ABSTRACT

Methods and systems for managing distributed systems are disclosed. The distributed systems may include endpoint devices that provide computer implemented services. The configuration of the endpoint devices may impact the provided computer implemented services. To manage the configuration of the endpoint devices, a communication architecture may be used that includes tags used to relay commands between orchestration and endpoint devices, and data from the endpoint devices to the orchestration devices and/or other devices.

20 Claims, 6 Drawing Sheets

SYSTEM AND METHOD FOR MANAGEMENT OF SECURED DEVICES

FIELD

Embodiments disclosed herein relate generally to device management. More particularly, embodiments disclosed herein relate to systems and methods for management of distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
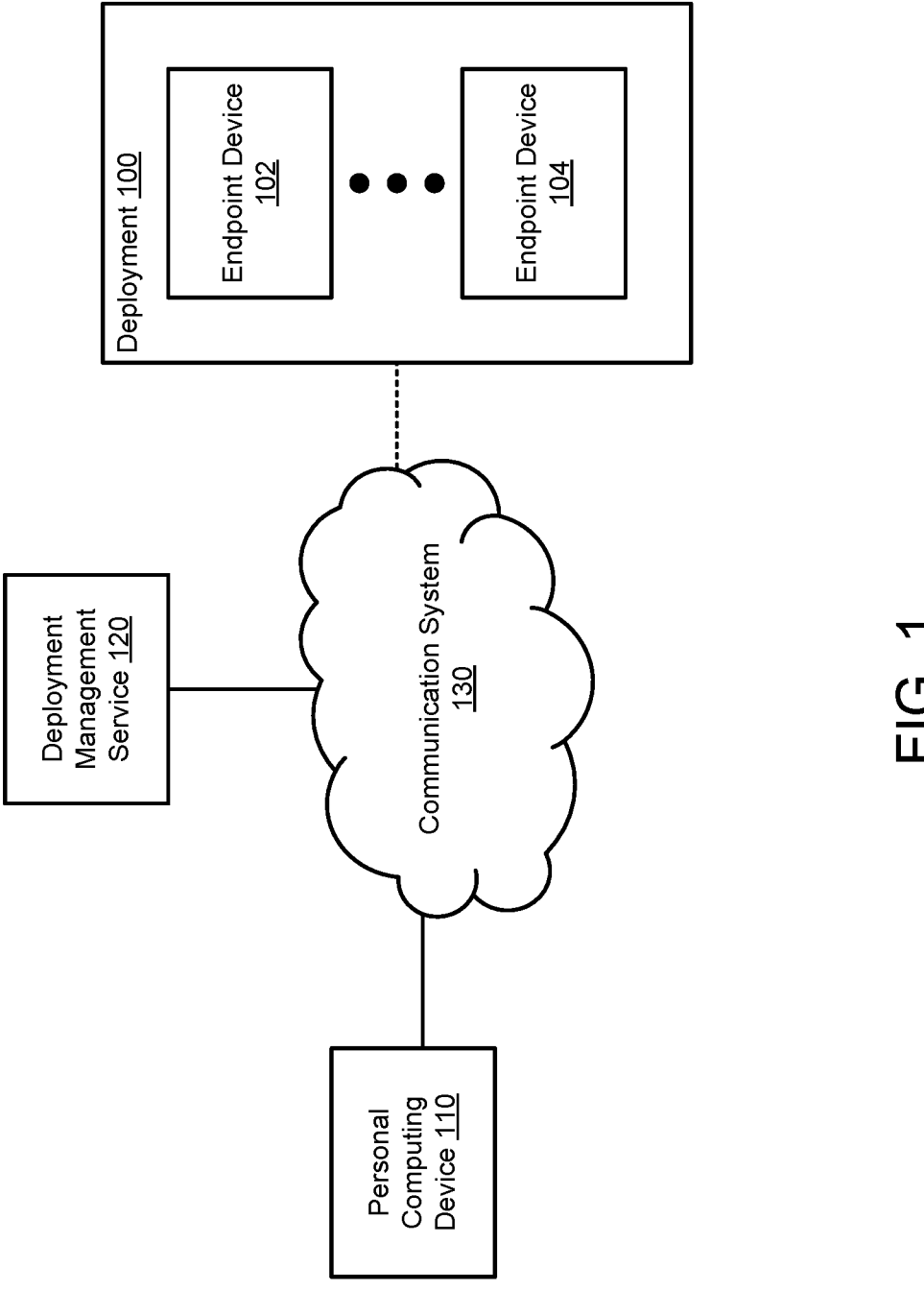
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using endpoint devices. To provide the computer implemented services, endpoint devices may perform various actions. The actions performed may depend on the configuration of the endpoint device. Thus, different configurations (e.g., software, hardware, etc.) may impact the computer implemented services provided by the endpoint devices.

For example, modifying a software configuration of an endpoint device may cause the endpoint device to provide different types of computer implemented services. Likewise changes in configuration of hardware components of the endpoint devices may impact security postures of the endpoint devices, efficiency in providing the computer implemented services, etc.

To manage the configuration of endpoint devices, an edge orchestrator may be used. The edge orchestrator may be responsible for maintaining the configuration of the endpoint devices. To do so, the edge orchestrator may initiate performance of various actions by the endpoint devices.

To initiate performance of the actions, the edge orchestrator may need to supply commands to the endpoint devices. Additionally, the edge orchestrator may need to obtain various information regarding the endpoint devices to make informed decisions regarding the actions that the endpoint devices should perform.

However, the endpoint devices may not be operably connected to the edge orchestrator (at least during some periods of time). To manage the endpoint devices without being directly operably connected to the endpoint devices, the edge orchestrator may use a personal computing device positioned near the endpoint devices to relay commands to the endpoint devices.

To relay the commands, the personal computing device may be operably connected to the edge orchestrator via a radio access network (e.g., to improve connectivity reliability for various locations of endpoint devices). When proximate to an endpoint device such that near field communications may be used, the personal computing devices may read and/or write data to tags of the endpoint devices. The use of near field communications may limited the likelihood of the endpoint devices being compromised through reduction of the surface area for attack. The endpoint devices may read and process the written data. Similarly, the personal computing device may process any data read from the tags.

In this manner, an efficient method for relaying information between an edge orchestrator and endpoint device may be established. For example, rather than trying to establish a general purposes operable connection, the tags of the endpoint devices may only facilitate reading and writing of data to storage of the tag. Accordingly, the computing complexes of the endpoint devices need not be active when data is written and/or when the personal computing device is proximate. Rather, the compute complexes of the endpoint devices may process written data (e.g., may periodically check, may check based on notifications from the tag indicating presence of unread data, etc.) when convenient.

Thus, embodiments disclosed herein may address, among others, the technical problem of management of distributed systems with limited connectivity. To manage endpoint of the distributed system, tags may be used to relay information between orchestrator and endpoint devices that are not operably connected to each other. By doing so, management of the endpoint devices may continue even while the endpoint devices are positioned at dark sites (e.g., limited or no Internet connectivity).

In an embodiment, a method for managing a secured device is provided. The method may include obtaining a command from an edge orchestrator using a first channel, the command being for the secured device; performing an action set based on the command, the action comprising at least one action selected from a list of actions consisting of: writing, using a second channel, the command to a tag associated with the secured device, and reading, using the second channel, a package from the tag. The tag may be operably connected to a compute complex of the secured device via a third channel.

The tag may be a near field communication tag.

The first channel may use a radio access network.

The tag may store the command until read by a compute complex of the secured device, the tag being adapted to store the command regardless of operating state of the compute complex.

The command may be one selected from a group of commands consisting of: resetting the secured device; establishing a terminal console between the secured device and another data processing system; modifying network information for the secured device; validating a service tag for the secured device; and providing identifying information for the secured device.

The package may include security data for the secured device, the security data being usable to cryptographically verify an identity of the secured device.

The secured device may not be operably connected to the edge orchestrator while the command is obtained and the action set is performed.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include deployment 100. Deployment 100 may be operated by an entity (e.g., a business) and include any number of endpoint devices.

Each of the endpoint devices may provide any number and type of computer implemented services. To provide the computer implemented services, the endpoint devices may need to perform certain types of actions, may need to be configured in certain manners, and/or may need to meet other types of criteria.

To improve the likelihood of endpoint devices 102-104 meeting these criteria, the system of FIG. 1 may include deployment management service 120. Deployment management service 120 may manage the operation of endpoint devices 102-104.

To manage the operation of endpoint device 102-104, deployment management service 120 may instruct endpoint device 102-104 to perform certain operations, may gather information regarding these devices, and/or may perform other types of actions. However, if deployment 100 is operably connected to a network such as the Internet through which deployment management service 120 may directly communicate with endpoint devices 102-104, then endpoint device 102-104 may be exposed to a variety of threats.

For example, malicious entities that may attempt to compromise endpoint device 102-104 through communications via the Internet or other networks.

Additionally, due to the environment in which any of endpoint devices 102-104 reside, it may be impractical to operably connect the endpoint devices to a network. For example, endpoint devices positioned in a remote location may lack wired and/or wireless network access.

Consequently, if network access is unavailable due to security concerns, lack of infrastructure, or other reasons, deployment management service 120 may be unable to manage deployment 100 through direct communications. Accordingly, endpoint devices 102-104 may enter undesired operating states in which desired computer implemented services are not provided.

In general, embodiments disclosed herein may provide methods, systems, and/or devices for managing endpoint devices. To manage the endpoint devices, commands and data may be relayed between the endpoint devices and management entities. The commands and data may be relayed using, at least in part, tags associated with the endpoint devices. The tags may be implemented using, for example, radio frequency identification (RFID) tag, near field communication (NFC) tags, and/or other types of tags.

The tags may allow for queued commands from management entities to be received and processed by endpoint devices 102-104 while the endpoint devices are not operably connected to the management entities via network connections. In FIG. 1, the lack of operably connectivity between the endpoint devices and other entities by the dashed line extending between deployment 100 and communication system 130.

To provide the above noted functionality, the system of FIG. 1 may include deployment 100, personal computing device 110, and deployment management service 120. Each of these components is discussed below.

Figure 2A:
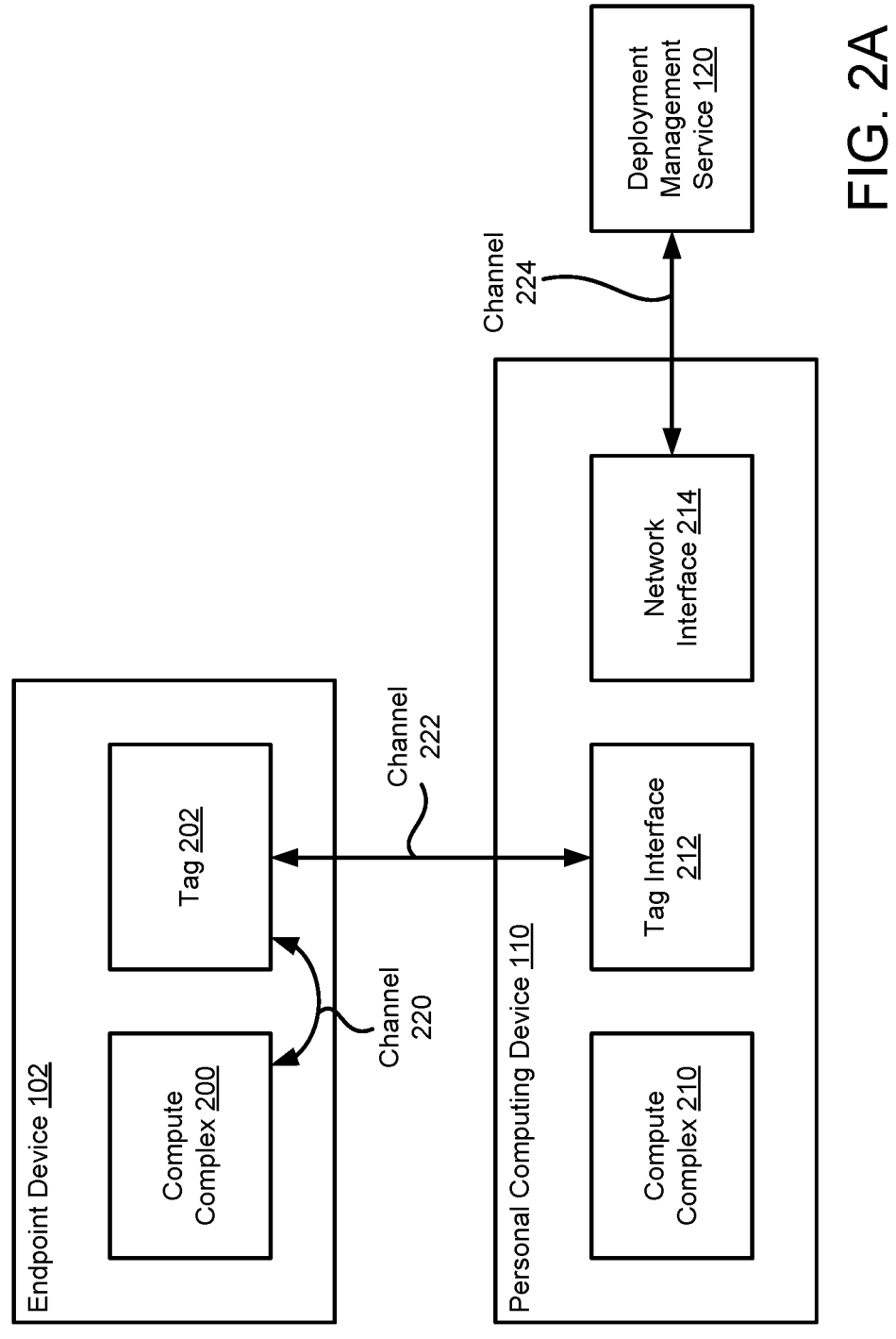
FIG. 2A shows diagram illustrating a communication architecture in accordance with an embodiment.

Deployment 100, as noted above, may provide computer implemented services using any number of endpoint devices. To do so, deployment 100 may (i) onboard endpoint devices, (ii) use the onboarded endpoint devices to provide the computer implemented services, and (iii) be managed by deployment management service 120. To facilitate management, endpoint devices 102-104 may include tags usable to transfer data for management as discussed above. Refer to FIG. 2A for additional details regarding transferring of data using tags.

Personal computing device 110 may facilitate management of endpoint devices 102-104 by deployment management service 120. To do so, personal computing device 110 may (i) relay data from deployment management service to endpoint devices 102-104 using tags, (ii) obtain other from endpoint devices 102-104 using the tags and relay the other data to deployment management services 120 (and/or use the data for other purposes), and/or (iii) perform other types of management functions. Personal computing device 110 may be implemented using, for example, a smart phone, a tablet computer, or other type of device. Personal computing device 110 may be used by, for example, a technician or other person tasked with managing any of endpoint devices 102-104. Refer to FIG. 2A for additional details regarding personal computing device 110.

Figure 2B:
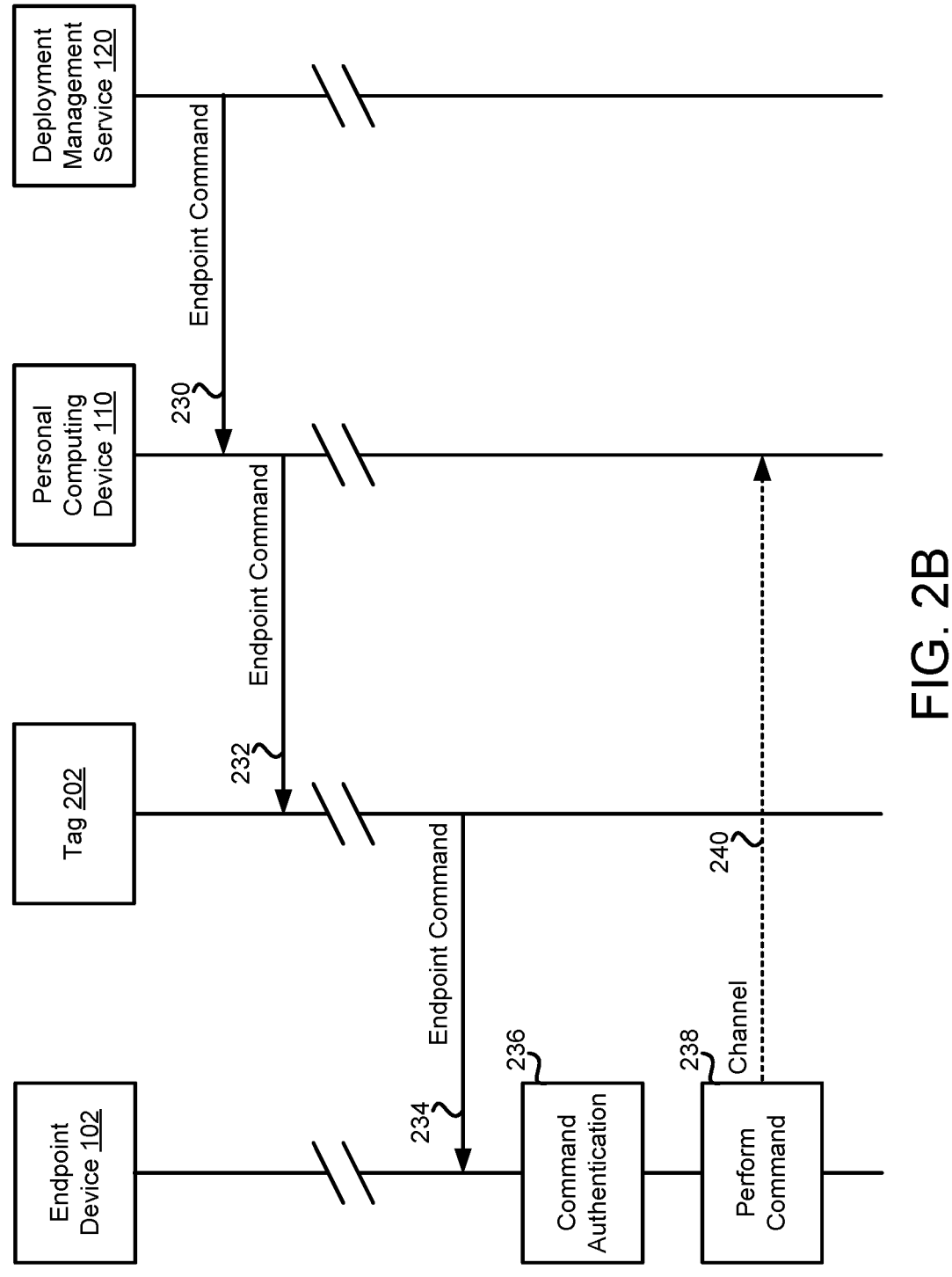
FIGS. 2B-2C show interaction diagrams in accordance with an embodiment.
Figure 2C:
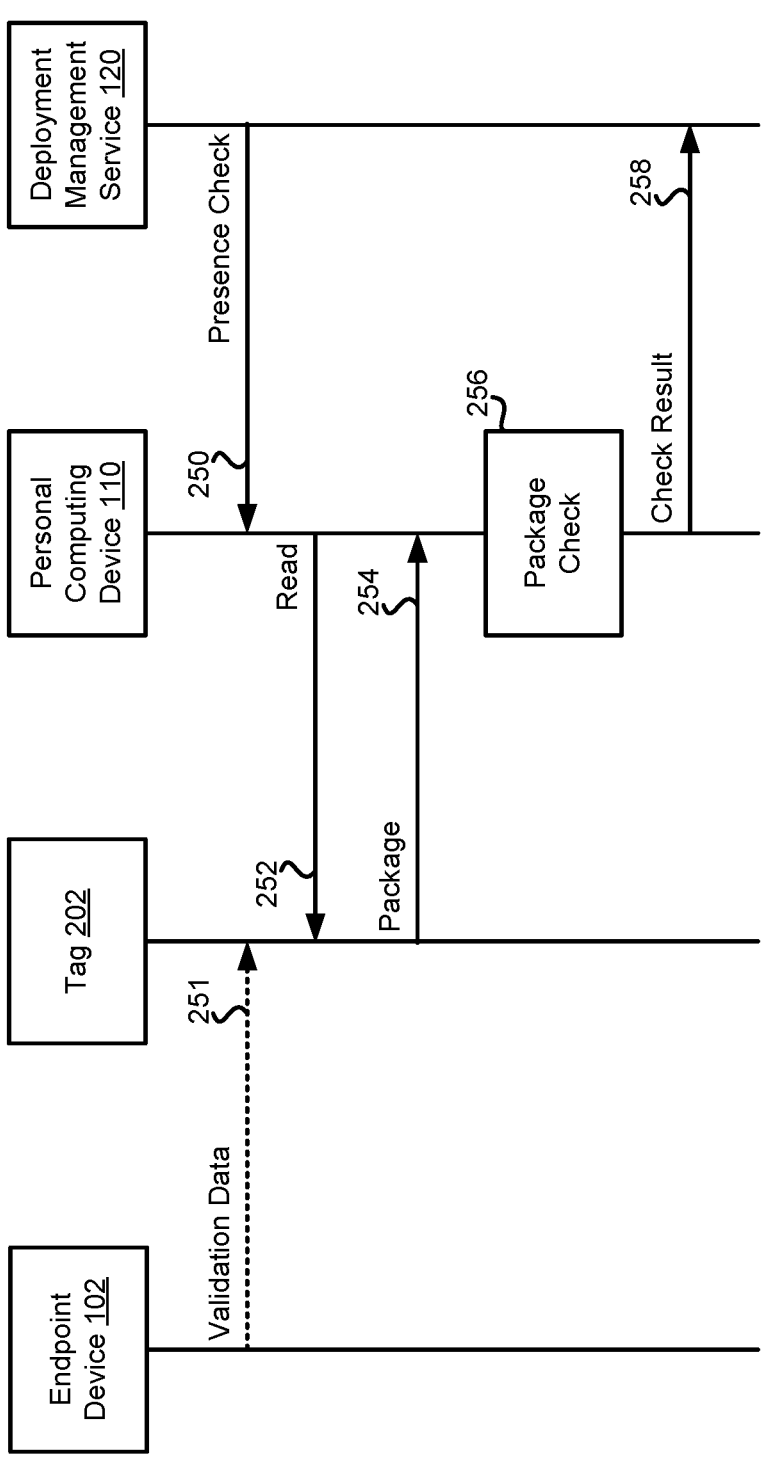

Deployment management service 120 may (i) maintain information regarding endpoint devices 102-104, (ii) initiate performance of various actions by endpoint devices 102-104 using person computing device 110, (iii) obtain information regarding personal computing device 110 and/or endpoint devices 102-104, and/or (iv) perform other types of actions to manage endpoint devices 102-104. Refer to FIGS. 2B-2C for additional details regarding management of endpoint devices.

Figure 3:
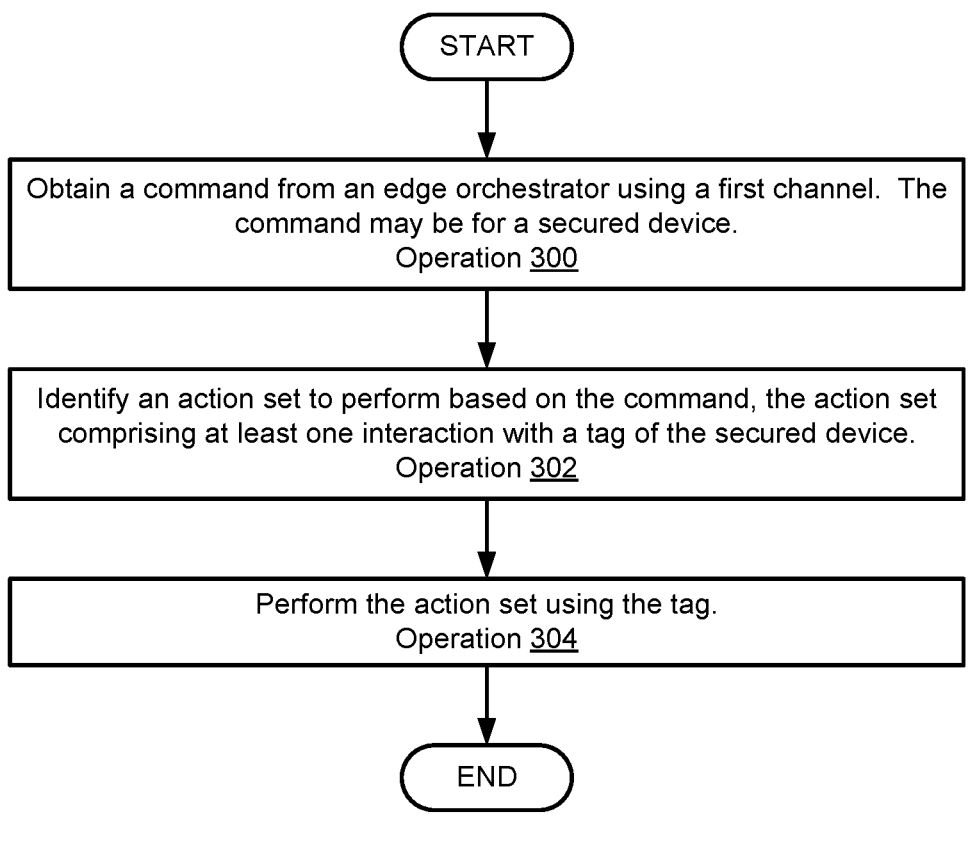
FIG. 3 shows a flow diagram illustrating a method in accordance with an embodiment.

When providing their functionality, any of (and/or components thereof) deployment 100, personal computing device 110, and/or deployment management service 120 may perform all, or a portion, of the methods illustrated in FIG. 3.

Any of (and/or components thereof) deployment 100, personal computing device 110, and/or deployment management service 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 130 includes a radio access network through which personal computing device 110 and deployment management service 120 are operably connected. In an embodiment, communication system 130 includes communication links between personal computing device 110 and tags of endpoint devices 102-104. Refer to FIG. 2A for additional details regarding communication between components of the system of FIG. 1.

While illustrated in FIG. 1 as including a limited number of specific components, a system in accordance with an embodiment may include fewer, additional, and/or different components than those components illustrated therein.

As discussed above, deployment management service 120 may utilize personal computing device 110 to relay information to and/or from endpoint devices 102-104.

Turning to FIG. 2A, a block diagram showing a communication architecture in accordance with an embodiment is shown. To facilitate communications between deployment management service 120 and endpoint device 102, multiple channels 220-224 may be used to implement operable connections. Each of these channels is discussed below.

Channel 220 may be a communication channel between tag 202 and compute complex 200 of endpoint device 102. Compute complex 200 may include processors, memory, and/or other hardware elements that support execution of applications hosted by endpoint device. Tag 202 may include, as discussed above, a RFID, NFC, or other type of tag. Tag 202 may include storage, low power electronics, and/or other hardware components that allow for data to be stored in tag 202 even while the host endpoint device 102 is powered down or otherwise not operating.

Channel 220 may be implemented using, for example, a bidirectional bus (e.g. I2C). Compute complex 200 may use channel 220 to read data stored in tag 202 and/or store data for reading by other devices.

Channel 222 may be a communication channel between tag 202 and tag interface 212 of personal computing device 110. Channel 222 may be implemented with a wireless communication channel that may comply with any number of standards (e.g., ISO 14443, ISO 15693, ISO 18000-3, EPCglobal, ISO 24730, ISO/IEC 14443A/B, FeliCa, etc.). Tag interface 212 and tag 202 may implement a read-write protocol through which personal computing device 110 may write data to tag 202 and read data from tag 202 via tag interface 212.

Tag interface 212 may be implemented using a chipset or other hardware that supports RFID and/or NFC communications. Tag interface 212 may be operably connected to compute complex 210 and/or network interface 214. Consequently, applications hosted by personal computing device 110 may store data in, retrieve data from, and process data from tag 202.

For example, compute complex 210 may host an agent of deployment management service 120. The agent may (i) queue commands and/or other communications from deployment management service 120 and that are directed to endpoint device 102, (ii) use tag interface 212 to store data in and retrieve data from tag 202, (iii) process data from tag 202, (iv) provide data to deployment management service 120 via network interface 214, and/or perform other functionalities that may enable deployment management service 120 to manage endpoint device 102.

Channel 224 may be a communication channel between network interface 214 and deployment management service 120. Channel 224 may include, for example, a radio access network link that supports and operable connection between personal computing device 110 and deployment management service 120. The radio access network link may be implemented using a chipset (e.g., network interface 214) and/or other hardware components of personal computing device 110. The radio access network link may be supported by, for example, a cellular communication carrier that may tie in their radio access network to the Internet and/or other networks.

Using the topology shown in FIG. 2A, deployment management service 120 may generate and send commands and/or other data structures to personal computing device 110. When in range of tag 202, person computing device 110 may write the command and/or other data structure to storage of tag 202. Compute complex 200 may obtain the data from tag 202 for processing. The processing may include, for example, (i) verification of the data (e.g., checking signatures and/or other types of cryptographic data), and (ii) performing one or more actions based on the read data. Because tag 202 may operate independently of compute complex 200, the host endpoint device may not need to be operational for data from personal computing device 110 to be stored in tag 202. Compute complex 200 may read and process the data from tag 202 at its leisure.

Turning to FIGS. 2B-2C, interactions diagrams illustrating processes performed by and interactions between components of a system in accordance with an embodiment are shown. In the diagrams, components of the system are illustrated using named rectangular boxes at the top of each figure. Lines descend from each of these boxes. Boxes superimposed over these lines may indicate processes performed by the corresponding component, and arrows between the descending lines indicate interactions between the components.

Generally, the processes and interactions are temporally ordered in an example order with time increasing from the top to the bottom of the page. For example, the interaction labeled as 230 may occur prior to the interaction labeled as 232. However, it will be appreciated that the processes and interactions may be performed in different orders, any may be omitted, and other processes or interactions may be performed without departing from embodiments disclosed herein.

Turning to FIG. 2B, a first interaction diagram in accordance with an embodiment is shown. FIG. 2B may illustrate a process for managing operations performed by endpoint device 102 in accordance with an embodiment.

At interaction 230, deployment management service 120 may send an endpoint command to personal computing device 110. The endpoint command may be an instructions for an endpoint device to, for example, (i) perform a recovery by reconfiguring endpoint device 102 to a default configuration, (ii) operably connect to another device, (iii) use certain network information (e.g., internet protocol address) in communications with other device, (iv) perform verification operations such as service tag verifications through which an identity of endpoint device 102 may be verified, and/or other types of commands that may be performed by endpoint device 102. The endpoint command may be signed and/or otherwise verifiable by endpoint device 102.

At interaction 232, when in range of tag 202, personal computing device 110 may write the endpoint command to storage of tag 202. Personal computing device 110 may do so (i) regardless of the operational state of the compute complex of endpoint device 102, and (ii) using a near field communication, RFID, and/or other type of direct communication method.

Once written to storage, at operation 234, the endpoint command may be read by endpoint device 102. Endpoint device 102 may do so at its leisure. For example, when written to tag 202, the compute complex of endpoint device 102 may be in a low power state, may not be operating at all, etc. When operation resumes, endpoint device 102 may check tag 202 for data and may read the data when new data is found to have been stored in tag 202.

Once read, at operation 236, the endpoint command may be authenticated. For example, cryptographic data from endpoint command may be used to verify that that the entity that created endpoint command has authority to issue the command. The command may be verified, for example, using a chain of certificates that define delegations of authority from a root of trust for endpoint device 102 to the entity that issued the command. If endpoint command can be authenticated, then at operation 238, the endpoint command may be performed. Depending on the command at issue, any number of actions may be performed. For example, a channel may be established at interaction 240 to personal computing device 110 (e.g., using a wireless network or other communication scheme), endpoint device 102 may reset configurations to defaults or other prescriptions, etc.

Turning to FIG. 2C, a second interaction diagram in accordance with an embodiment is shown. FIG. 2C may illustrate a process for validating present of endpoint device 102 with respect to personal computing device 110 in accordance with an embodiment.

To validate presence of endpoint device 102, at interaction 250, deployment management service 120 may generate and send a presence check request to personal computing device 110. When received by personal computing device 110, at interaction 252, personal computing device 110 may process the request. For example, the agent hosted by the compute complex of personal computing device 110 may read and interpret the request from deployment management service 120. In response, personal computing device 110 may perform a read of the tags of endpoint devices within range of personal computing device 110. In this example, tag 202 of endpoint device 102 may be within range of personal computing device 110. Consequently, a data package stored in tag 202 may be obtained by personal computing device at interaction 254.

The data package may include information regarding endpoint device 102. For example, the data package may include validation data such as a signature or other cryptographic data (e.g., a public key) usable to verify the identity of endpoint device 102. The validation data may be written to tag 202 at interaction 251 which may be performed at any time prior to interaction 252. While shown with respect to endpoint device 102 participating in the interaction, the data may be written to tag 202 via other entities (e.g., a service at a manufacturing site of endpoint device 102) without departing from embodiments disclosed herein.

A copy of the public key may be provided by deployment management service 120 and/or other entities (e.g., such as a key manager) prior to and/or during the presence checking process. For example, the public key may be provided as part of interaction 250.

Once the package is obtained from tag 202, personal computing device 110 may, at interaction 256, may check the content of the package (and/or other read packages) to determine whether endpoint device 102 is the endpoint device for which the presence check is being performed. To perform the check, the public key provided by deployment management service 120 may be compared to the content of the package obtained during interaction 254.

The outcome of the comparison may be conveyed to deployment management service 120 during interaction 258 as a check result. The check result may indicate whether an endpoint device for which the presence check is performed is within the presence of personal computing device 110.

As discussed above, the components of FIG. 1 may perform various methods to manage endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing an endpoint device in accordance with an embodiment is shown. The method may be performed by any of deployment 100, personal computing device 110, deployment management service 120, and/or other components of the system shown in FIG. 1.

At operation 300, a command from an edge orchestrator is obtained using a first channel. The command may be for a secured device. The command may be obtained by receiving it via a message. The message may be received via the first channel.

The first channel may use a radio access network. The radio access network may connect a personal computing device to the edge orchestrator via the radio access network. For example, the radio access network may provide connectivity to the Internet and/or other network through which the edge orchestrator may be reached.

In an embodiment, the secured device is not operably connected to other devices. For example, the secured device may have its network interface not processing communications (or advertising presence of the secured device on a network), the secured device may be positioned at a dark site where only a local network is operating (e.g., and unconnected to the edge orchestrator), and/or the secure device may not be operably connected to the edge orchestrator for other reasons.

In an embodiment, the secured device lacks human interface devices. For example, the edge device may not include a display, a mouse or other type of pointing device, a keyboard, etc. In other words, the secured device may be headless.

For example, the secured device may be an edge device positioned at a remote location (e.g., with respect to a data center environment in which the edge orchestrator may be positioned) and may not include local human interface devices. A technician or other person may carry the personal computing device, and may be proximate to the secured device for maintenance or other purposes.

The command may be any type of command with respect to the edge orchestrator. For example, the command may indicate some action to be performed by the secured device. In another example, the command may indicate some action to be performed by the personal computing device with respect to the secured device.

The command reflect a queued command by the edge orchestrator for eventual performance.

At operation 302, an action set to perform is identified based on the command. The action set may include at least one interaction with a tag of the secured device. The interaction may include writing data to the tag and/or reading data from the tag.

The actions of the action set may be identified based on the command. The actions may be identified, for example, by performing a lookup based on the command using a lookup data structure (e.g., a lookup table). The lookup may return one or more actions.

The one or more actions may include (i) writing data to the tag, (ii) reading data from the tag, (iii) processing read data from the tag, (iv) providing processed and/or read data from the tag, and/or perform other types of actions to effectuate a goal of the edge orchestrator with respect to management of the secured device and/or other secured device.

In an embodiment, the one or more actions include writing data based on the command to the tag. The data may include instructions, cryptographic data, and/or other data that when read by the secured device may allow the secured device to perform action as desired by the edge orchestrator. The actions may include, for example, performing a reset of the secured device, instantiating an operable connection to another computing device such as the personal computing device, modifying networking data such as internet protocol addresses used by the secured device, performing verification actions, and/or other types of operations that may be initiated by the edge orchestrator for management purposes.

In an embodiment, the one or more actions include reading data from the tag. The read data may include, for example, cryptographic data usable to authenticate the secured device's presence, service tags or other identification data, and/or other types of data.

At operation 304, the action set is performed using the tag. The action set may be performed by writing data to the tag and/or reading data from the tag. The writing and reading may be performed regardless of a state of other components of the secured device. For example, other components of the secured device (such as a compute complex) may be in a low power state, may be shut off, etc.

In addition to writing and reading data, the action set may include other actions such as, for example, processing data read from the tag, communicating with the secured device via an established operable connection (e.g., via a local network or direct communication, the secured device may establish a secure connection to the personal computing device based on data written to the tag), and/or other types of actions usable to assist the edge orchestrator in managing the secured device.

Any of the actions may be performed in cooperation with other actions performed by the secured device. For example, when data is written to the tag, the secured device's compute complex may read the data and perform actions in cooperation with actions performed by the personal communication device.

The method may end following operation 304.

Using the method illustrated in FIG. 3, embodiments disclosed herein may facilitate management of secured devices that may otherwise not be operably connected to edge orchestrators, may not include human interface devices, and/or that may otherwise be hardened such that the tag may be a single point of communication for the secured device for management purposes.

Figure 4:
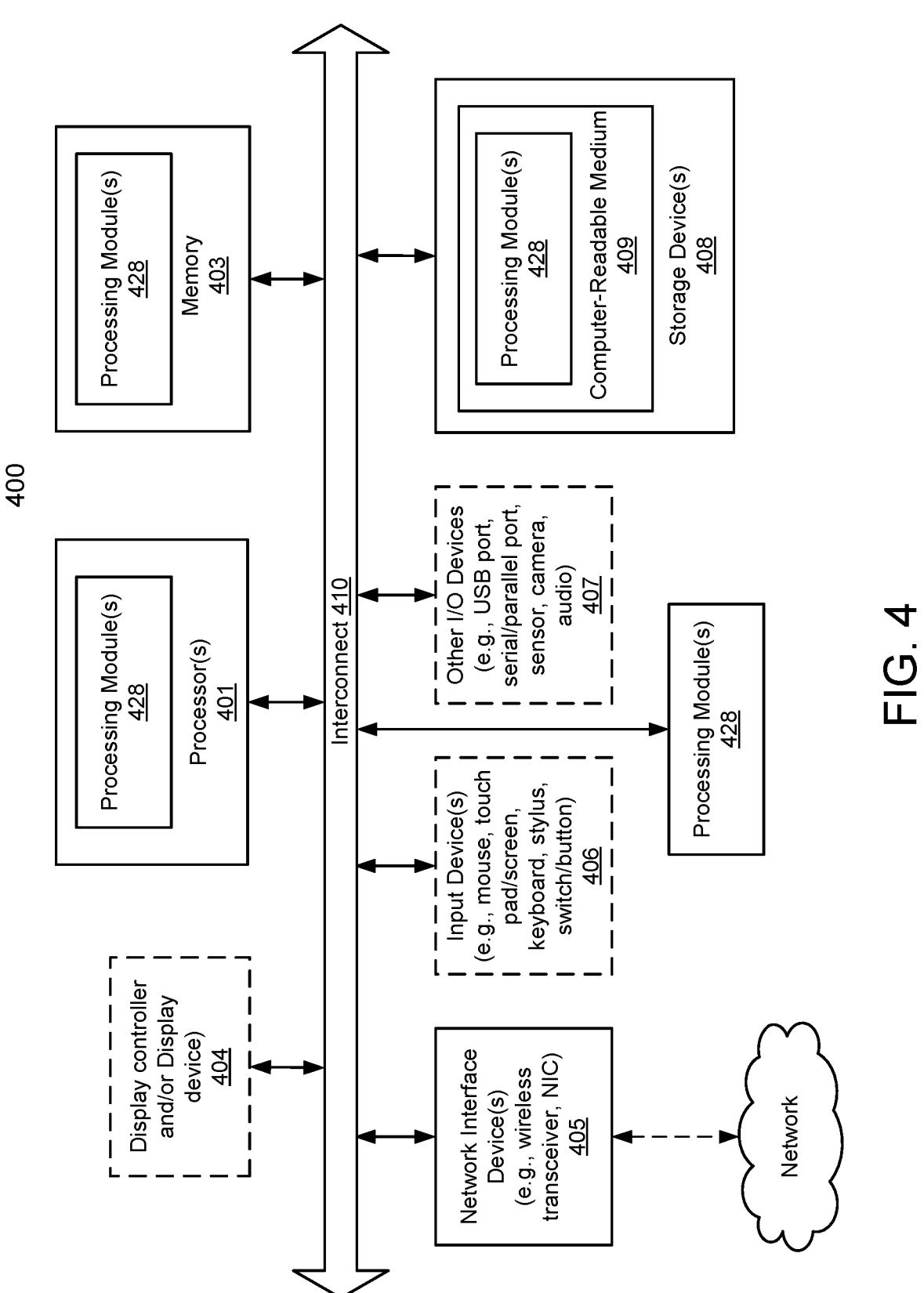
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a secured device, the method comprising:

obtaining, by a personal computing device, a command from a deployment management service using a first channel, the command being for the secured device; and performing, by the personal computing device, an action set based on the command, the action set comprising at least one action selected from a list of actions consisting of:

writing, using a second channel, the command to a tag associated with the secured device, the second channel directly connecting the personal computing device to the tag, and reading, using the second channel, a package from the tag, wherein the tag is operably connected to a compute complex of the secured device via a third channel, and wherein the tag stores the command until read by the compute complex of the secured device, the tag being adapted to store the command regardless of operating state of the compute complex.

2. The method of claim 1, wherein the tag is a near field communication tag.

3. The method of claim 2, wherein the first channel uses a radio access network.

4. The method of claim 1, wherein the command comprises one selected from a group of commands consisting of:

resetting the secured device;

establishing a terminal console between the secured device and another data processing system; and modifying network information for the secured device.

5. The method of claim 1, wherein the package comprises security data for the secured device, the security data being usable to cryptographically verify an identity of the secured device.

6. The method of claim 1, wherein the secured device is not operably connected to the deployment management service while the command is obtained and the action set is performed.

7. The method of claim 1, wherein the personal computing device is a cell phone.

8. The method of claim 1, wherein the compute complex hosts an agent of the deployment management service.

9. A non-transitory machine-readable medium having instructions stored therein, which when executed by at least one processor, cause a system to perform operations for managing a secured device, the operations comprising:

obtaining, by a personal computing device, a command from a deployment management service using a first channel, the command being for the secured device; and performing, by the personal computing device, an action set based on the command, the action set comprising at least one action selected from a list of actions consisting of:

writing, using a second channel, the command to a tag associated with the secured device, the second channel directly connecting the personal computing device to the tag, and reading, using the second channel, a package from the tag, wherein the tag is operably connected to a compute complex of the secured device via a third channel, and wherein the tag stores the command until read by the compute complex of the secured device, the tag being adapted to store the command regardless of operating state of the compute complex.

10. The non-transitory machine-readable medium of claim 9, wherein the tag is a near field communication tag.

11. The non-transitory machine-readable medium of claim 10, wherein the first channel uses a radio access network.

12. The non-transitory machine-readable medium of claim 8, wherein the command comprises one selected from a group of commands consisting of:
   resetting the secured device;
   establishing a terminal console between the secured device and another data processing system; and
   modifying network information for the secured device.

13. The non-transitory machine-readable medium of claim 9, wherein the package comprises security data for the secured device, the security data being usable to cryptographically verify an identity of the secured device.

14. The non-transitory machine-readable medium of claim 9, wherein the secured device is not operably connected to the deployment management service while the command is obtained and the action set is performed.

15. A system, comprising:
   at least one processor; and
   a memory coupled to the processor to store instructions, which when executed by the processor, cause the system to perform operations for managing a secured device, the operations comprising:
      obtaining, by a personal computing device, a command from a deployment management service using a first channel, the command being for the secured device; and
      performing, by the personal computing device, an action set based on the command, the action set comprising at least one action selected from a list of actions consisting of:

writing, using a second channel, the command to a tag associated with the secured device, the second channel directly connecting the personal computing device to the tag, and reading, using the second channel, a package from the tag, wherein the tag is operably connected to a compute complex of the secured device via a third channel, and wherein the tag stores the command until read by the compute complex of the secured device, the tag being adapted to store the command regardless of operating state of the compute complex.

16. The system of claim 15, wherein the tag is a near field communication tag.

17. The system of claim 16, wherein the first channel uses a radio access network.

18. The system of claim 15, wherein the command comprises one selected from a group of commands consisting of:
   resetting the secured device;
   establishing a terminal console between the secured device and another data processing system; and
   modifying network information for the secured device.

19. The system of claim 15, wherein the package comprises security data for the secured device, the security data being usable to cryptographically verify an identity of the secured device.

20. The system of claim 15, wherein the secured device is not operably connected to the deployment management service while the command is obtained and the action set is performed.

* * * * *